(12) United States Patent
Watson et al.

(10) Patent No.: US 6,477,258 B1
(45) Date of Patent: Nov. 5, 2002

(54) TRANSDUCER ASSEMBLY

(75) Inventors: Michael Barry Watson, 50 Churchfield Road, Walton on Thames, Surrey (GB), KT12 25Y; Richard Herman, Sunbury on Thames (GB)

(73) Assignee: Michael Barry Watson, Walton on Thames (GB)

( * ) Notice: Subject to any disclaimer, the term of this patent is extended or adjusted under 35 U.S.C. 154(b) by 0 days.

(21) Appl. No.: 09/582,191
(22) PCT Filed: Dec. 23, 1998
(86) PCT No.: PCT/GB98/03908
§ 371 (c)(1), (2), (4) Date: Jun. 23, 2000
(87) PCT Pub. No.: WO99/34640
PCT Pub. Date: Jul. 8, 1999

(30) Foreign Application Priority Data

Dec. 24, 1997 (GB) .............................. 9727357

(51) Int. Cl.⁷ .............................. H04R 25/00
(52) U.S. Cl. .......... 381/380; 381/373; 381/374; 381/375
(58) Field of Search .............. 381/327, 328, 381/330, 370, 374, 375, 380, 381, 382, FOR 149, FOR 150, 373; 379/430; 181/129, 130, 135, 20

(56) References Cited

U.S. PATENT DOCUMENTS

| | | | | |
|---|---|---|---|---|
| 2,904,640 A | * | 9/1959 | Dreher et al. | 181/130 |
| 4,293,742 A | | 10/1981 | Sato et al. | 179/178 |
| 4,878,560 A | | 11/1989 | Scott | 181/130 |
| 5,613,222 A | * | 3/1997 | Guenther | 379/430 |

FOREIGN PATENT DOCUMENTS

| | | | | |
|---|---|---|---|---|
| CA | 002070956 | * | 12/1992 | 379/430 |
| WO | 95-34156 | | 12/1995 | |

OTHER PUBLICATIONS

Patent Abstracts of Japan, vol. 18, No. 535, JP 06 188960 Matsushita, Jul. 8, 1994.

* cited by examiner

Primary Examiner—Huyen Le
(74) Attorney, Agent, or Firm—Jacobson Holman, PLLC

(57) ABSTRACT

A transducer assembly for use with an apparatus comprising a sound transmitting earpiece comprises a sound transmitting element (1) adapted to be worn between such an earpiece and the ear, a sound transducer (3), to be located remote from the earpiece and a hollow tube (2) for acoustically coupling the sound transmitting element (1) to the transducer (3).

8 Claims, 1 Drawing Sheet

TRANSDUCER ASSEMBLY

BACKGROUND OF THE INVENTION

This invention concerns a transducer assembly adapted to be worn by a person using an auxiliary apparatus including a sound transmitting earpiece, for the purpose of picking up sound signals received from such an earpiece, in addition to the speech of the wearer, and/or for transmitting to the wearer sound signals to supplement those generated by the earpiece.

The auxiliary apparatus comprising the earpiece may, for example, be a mobile telephone, cordless telephone or telephone handset.

SUMMARY OF THE INVENTION

It is an object of the invention to provide such a transducer assembly that is less susceptible to electrical interference generated by the apparatus comprising the earpiece.

For example, it has been found that attempts to use a microphone near a mobile telephone or cordless telephone, for the purposes of picking up and recording speech signals together with incoming signals from the mobile telephone, can be defeated by the large amounts of electrical interference generated by such devices. This interference sometimes can be an annoyance up to 0.5 meters from microphone to source and can be particularly troublesome if the microphone transducer is actually or almost in contact with the body of the telephone without some sort of electromagnetic screening between them.

In accordance with the invention there is provided a transducer assembly comprising a sound transmitting element adapted to be worn in the ear, a transducer means for converting sound to electrical signals and/or vice versa, and an elongate hollow conduit extending between said sound transmitting element and said transducer, the arrangement being such that, in use, with the sound transmitting element located between the ear of the wearer and an external earpiece, the hollow conduit serves to provide coupling between the sound transmitting element and the transducer located at a point remote from the earpiece. An assembly in accordance with the invention allows a transducer to be located remotely from an apparatus such as a mobile telephone, so that it is free of electrical interference, whilst being acoustically coupled to the space between an earpiece of the apparatus and the ear of the wearer in a surprisingly simple manner. The sound transmitting element to be located between the earpiece and the ear may, for example, comprise a ball-shaped portion of synthetic plastic foam material and the conduit means may be provided by a simple hollow tube of flexible material engaging within the foam material at a point offset from the centre thereof. very surprisingly a tube having a bore of only approximately 1–2 mm in diameter will provide effective acoustic coupling to the transducer over a distance of 0.25–1 meter. The sound transmitting element may alternatively comprise a moulded element of more rigid material shaped to fit the ear and incorporating a sound transmitting aperture providing coupling between the ear and an external earpiece, with a transverse bore enabling coupling between the said aperture and a flexible tube providing the required conduit.

The invention is illustrated by way of example in the accompanying drawings, in which:

DETAILED DESCRIPTION OF THE PREFERRED EMBODIMENT

Figure 1:
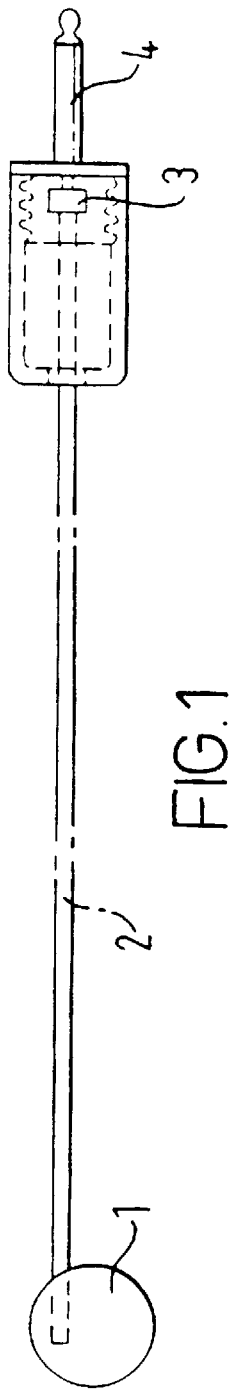
FIG. 1 is a diagrammatic view of a microphone assembly according to one embodiment of the invention.

Referring to FIG. 1, the reference numeral 1 illustrates a ball of foam plastic material dimensioned to fit within the ear of a wearer, whereas the numeral 2 illustrates a length of flexible tubing having a bore of approximately 1–2 mm. The reference numeral 3 illustrates a electret microphone or sound transducer that is acoustically coupled to the tubing 2. Reference numeral 4 illustrates a conventional electrical plug for use in coupling the transducer 3 to an external electrical circuit, the housing of the plug serving to enclose the transducer 3.

The distance between the foam ball 1 and the plug 4 may be in the region of 0.25–1 meter, and in use the foam ball 1 is inserted into the ear, with the plug 4 inserted into a device such as a tape recorder. Surprisingly, when the earpiece of a mobile phone is placed against the ear, the acoustic coupling provided by the assembly is sufficient to enable recording both of the speech of the wearer of the device and of incoming signals from the mobile telephone, without the attendant electrical interference that would occur if the transducer were in the region of the ear of the wearer.

The offset ball-shaped foam element 1 allows for maximum variation between ear shapes and sizes whilst reducing fatigue with prolonged use of the device.

However, a variety of modifications may be made to the device of FIG. 1 without departing from the scope of the invention.

Thus, the ball-shaped foam element 1 may be replaced by other shapes that might include a football, a golf ball, or any other such representation of a device appropriate to a particular commercial product, for example a horses head.

Figure 2:
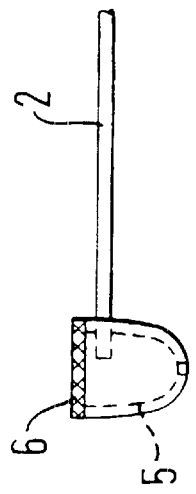
FIG. 2 is a fragmentary view illustrating a nodification of the arrangement of FIG. 1.

Alternatively, as shown in FIG. 2, the element 1 may be replaced by an element 5 of hard plastic material, such as that provided on a conventional earphone. The hollow interior of the member 5 may be closed by a foam cover 6 and the tube 2 may be inserted through a transverse hole in the element 5 for acoustic coupling with the transverse hole thereof.

Figure 3:
FIG. 3 is a fragmentary view showing a further modification of the arrangement of FIG. 1.

As shown in FIG. 3, the element 1 or 5 may be omitted if the end of the tubing 2 is formed into a hook-shape to fit into the ear. The tubing 2 may be shaped by heating and bending, or may be supported in this shape by an internal member pushed into the end of the tube.

Figure 4:
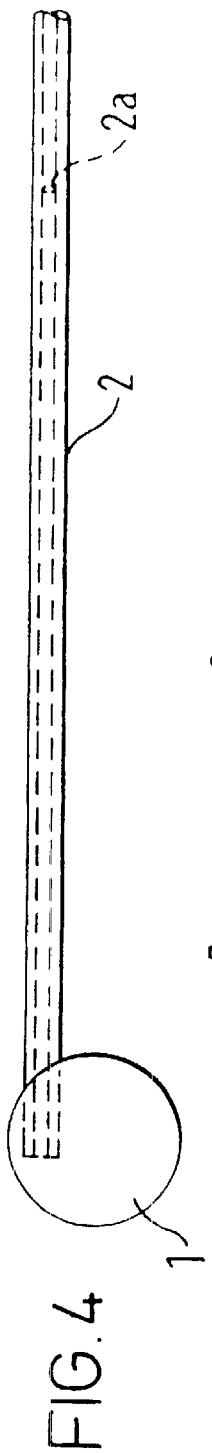
FIG. 4 is a view showing a yet further modification of the arrangement of FIG. 1.

As shown in FIG. 4, the flexible tube 2 can be provided with one or more small holes 2a at about mouth distance from the sound transmitting element 1 to provide additional sound level from the operator when speaking.

Figure 5:
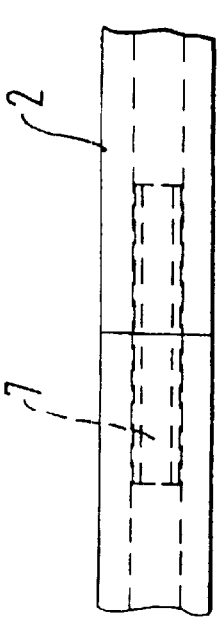
FIG. 5 is a diagrammatic view illustrating a joint in tubing forming part of the device of FIG. 1.

As shown in FIG. 5, the flexible tube 2 can be cut and rejoined using an internal (or external) short length of solid or flexible hollow tubing 7. This allows the operator to cut the tubing to a more convenient length and then to rejoin it. Also, if the junction point is near the element 1, the latter can easily be removed for cleaning.

Various other modifications and alterations may be made to the assembly without departing from the scope of the invention. Some variations may be summarised as follows.

The flexible sound tube 2 can be rubber or plastic or a combination of materials. The colour can be any plain colour or translucent or clear or printed to suit any promotional situation, e.g. the British flag or the American "Stars and Stripes" etc., or indeed a company name or logo.

A length of find thread or string or other material or plug of material might be used to modify the tonal characteristics of the assembly by inserting it inside the sound tube 2.

The flexible sound tube 2 can be coiled like telephone handset flex.

The sound tube 2 can be shaped to assist sound levels, e.g. tapered from one end.

The sound tube 2 can be stretched so as to cover the microphone capsule 3 or the capsule can have a tube arrangement to facilitate easier putting on and removal of the sound tube 2.

The microphone capsule 3 can be an electret or a magnetic or piezo or ceramic or other transducer.

This could also include a transducer capable of sending information instead of receiving it.

The plug 4 can be male or female and its rear cover conceals the microphone capsule 3. The rear cover can also be of metallic material, e.g. nickel plated brass to help electromagnetically screen the transducer and its connections to the plug.

A stereo plug would permit separate connections to sender transducer and receiving transducer. Separate parallel tubes or co-axial tubes or a single tube would act as the transmission path between plug and operator. This would be particularly useful when 'patching' between mobile or normal landline telephones and for example a radio transmitter with suitable input circuitry.

Electronic circuitry to alter the volume level or to modify tonal response or to compensate for the tonal alterations due to the tubing may be placed inside the plug cover using microelectronic techniques.

The mouthpiece hole 2a can have a flexible tube (thinner than the sound tube 2) passed through it acting so as to convey speech down next to the microphone capsule 3, the extra tube to tun internal to the sound tube and entering through a hole made in the sound tube at about mouth distance from the ear end of that tube. The lower end of the inner sound tube can extend only a short distance down inside the outer sound tube or it can extend all the way down almost making contact with the microphone capsule 3. This additional inner sound tube will act so as to alter the sound balance between the ear end of the outer sound tube and the sounds uttered by the operator. The hole made to reinforce the sounds uttered by the operator might (instead of inserting an inner sound tube) have a hollow plastic or metal tapered or untapered tube inserted downwards into it to convey sounds uttered by the operator down a short distance into the outer sound tube.

The auxiliary sound tube can be run from about mouth level in use down outside the main sound tube to join it further down near the microphone capsule. It can thus be the same or even larger than the tube to the ear. A convenient form would already be manufactured to have a figure of eight cross section and the final 150 mm say of tubing at the ear end can be removed to bring its opening down to mouth level. The lower end could then be joined in a Y connection so that both sound sources reach the microphone together.

What is claimed is:

1. A transducer assembly comprising an earpiece having a sound transmitting element adapted to be worn in the ear and to provide acoustic coupling between the ear and ambient sound occurring externally of the sound transmitting element, a transducer means for converting sound to electrical signals, and an elongate hollow conduit extending between said sound transmitting element and said transducer, the arrangement being such that, in use, with the sound transmitting element worn in the ear, the sound transmitting element acoustically couples external sound to the ear and the hollow conduit serves to provide acoustic coupling between the sound transmitting element and the transducer located at the end of the hollow conduit remote from the earpiece.

2. An assembly as claimed in claim 1, wherein said conduit comprises a first hollow tube of flexible material.

3. An assembly as claimed in claim 2, wherein said hollow tube has a bore of 1–2 mm in diameter.

4. An assembly as claimed in claim 2, wherein said hollow tube has a length of 0.25–1 meter.

5. An assembly as claimed in claim 2, wherein said hollow tube has one or more apertures in the wall thereof in a position such that the said one or more apertures can be located adjacent the mouth of a user when said sound transmitting element is located in an ear of the user.

6. An assembly as claimed in claim 2, wherein said sound transmitting element comprises a shaped body of synthetic plastic foam material penetrated by said hollow tube.

7. An assembly as claimed in claim 2, wherein said sound transmitting element comprises a hooked end of said hollow tube.

8. An assembly as claimed in claim 2, wherein said sound transmitting element comprises a member shaped to fit the ear and having a sound transmitting aperture acoustically coupled to said hollow tube via a transverse bore.

\* \* \* \* \*